Feb. 15, 1938. W. R. ARMSTRONG, SR 2,108,187
SIGNAL DEVICE
Filed April 16, 1937  2 Sheets-Sheet 1
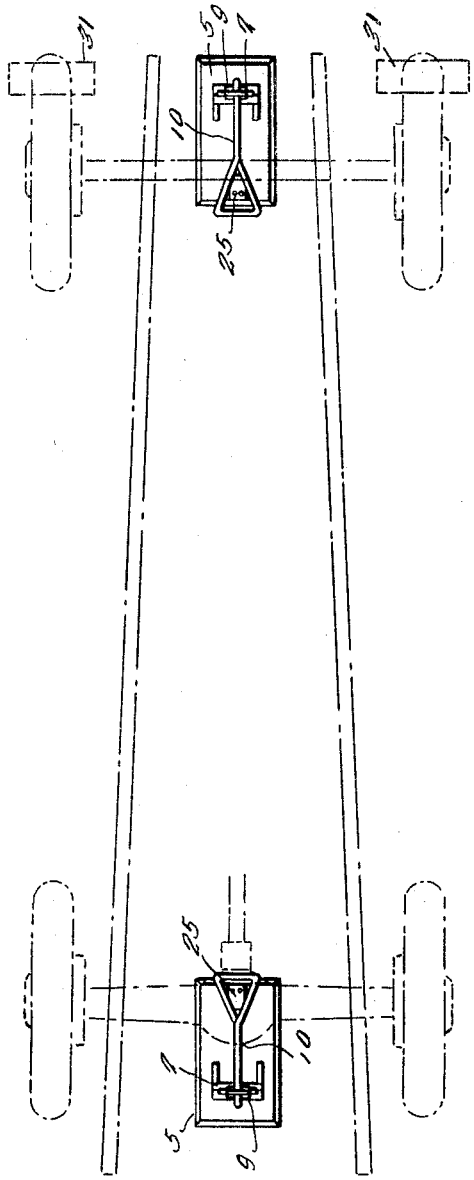
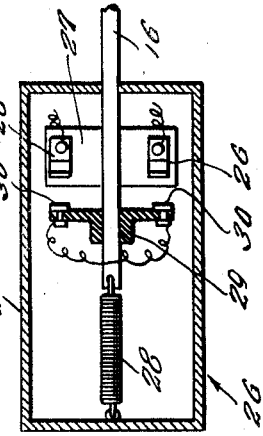
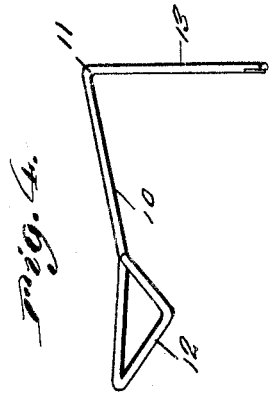
Inventor
W. R. Armstrong Sr.
By Clarence A. O'Brien
Hyman Berman
Attorneys

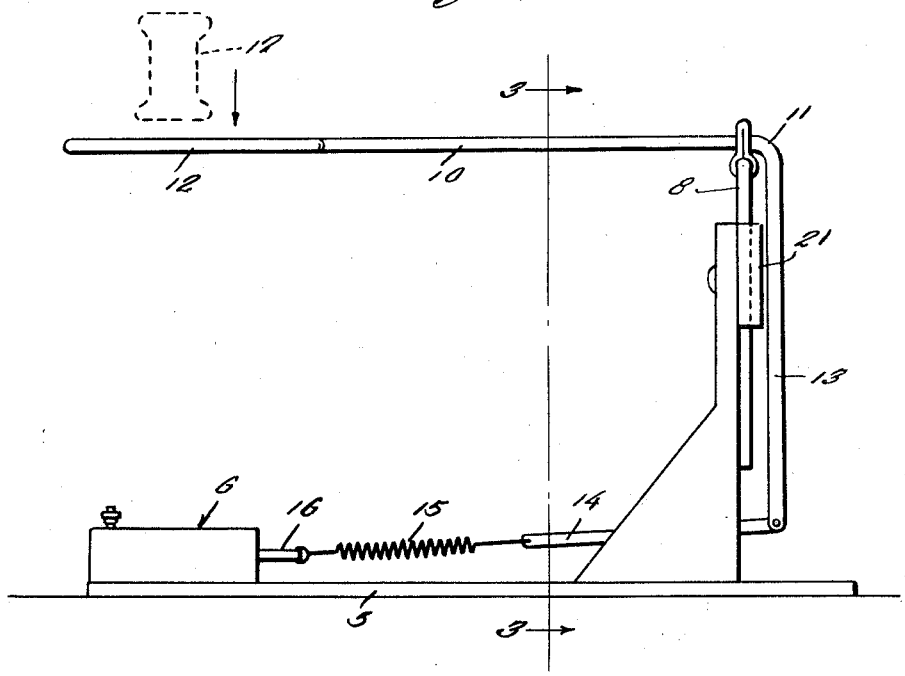
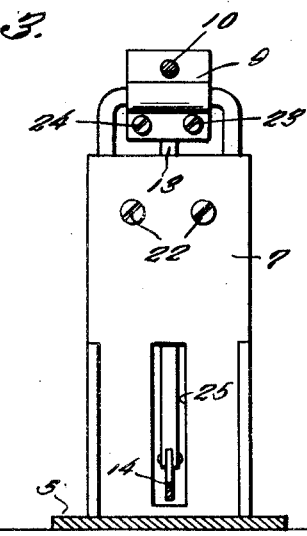
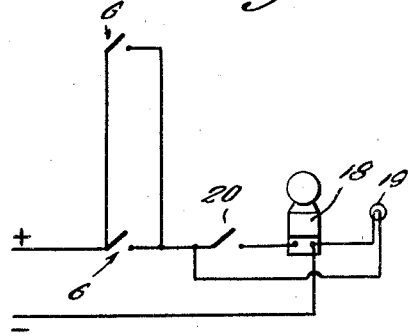

Patented Feb. 15, 1938

2,108,187

UNITED STATES PATENT OFFICE 2,108,187

SIGNAL DEVICE

Walter R. Armstrong, Sr., New Orleans, La.

Application April 16, 1937, Serial No. 137,346

3 Claims. (Cl. 177—311)

This invention is a device primarily for use in privately owned garages for indicating, at a point remote from the garage, the condition of the pneumatic tires of the automobile stored in the garage.

Briefly, the invention consists in the provision of an electrically operable signal, a control switch therefor, and mechanism for tripping the switch incidental to an under-inflation of the pneumatic tires for closing the circuit to the signal.

The invention, together with its objects and advantages will be best understood from a study of the following description, taken in connection with the accompanying drawings, wherein:

Figure 1 is a top plan view illustrating the application of the invention.

Figure 2 is a side elevational view of a switch and operating mechanism provided therefor in accordance with the present invention.

Figure 3 is a vertical sectional view taken substantially on the line 3—3 of Figure 2.

Figure 4 is a perspective view of a trip-arm.

Figure 5 is a sectional view through a switch; and

Figure 6 is a diagram of the signal circuit.

In accordance with the present invention I provide for disposition under the front and rear axles respectively of an automobile, an assembly consisting of a base plate 5 at one end of which is suitably provided an electric switch 6 and at the other end of which is provided a standard 7 on which is mounted for vertical adjustment an inverted U-shaped member 8 that is equipped at its upper end with a bracket 9 mounted to pivot about the closed end of the U-shaped member 8 and provided with an opening through which extends one arm 10 of a substantially L-shaped trip lever 11. The free end of the arm 10 is bent into triangular form to provide a head 12 adapted to be positioned under an axle of the vehicle while the free end of the arm 13 of the lever 10 is pivotally connected to one end of a link 14 which at its other end is connected through the medium of a coil spring 15 to the operating rod 16 of switch 6.

From the description of the invention thus far, it will be seen that as, for example, the tires of the front wheels of the automobile become deflated the front axle 17 of the automobile will move downwardly into engagement with the head 12 of the arm 10 thus causing the lever 11 with the bracket 9 to rotate in a counter-clockwise direction. This will result in a pull being exerted on the rod 16 of switch 6 for closing the switch and thereby completing a circuit through a pair of electrically operable signal elements, which in the present instance consists of an electric bell 18 to give an audible signal, and an electric lamp 19 to give a visible signal, and which signals may be arranged at some point remote from the garage, as for example, in a room of the house of the owner of the garage.

In the wiring diagram shown in Figure 6, the switches 6 are shown diagrammatically, and interposed in the circuit between the switches 6 and the signal elements 18, 19, is a manually operable control switch 20 which, when closed, partly completes the circuit, which latter is completed upon the closing of either or both the switches 6.

Referring more in detail to each of the switches 6 and operating means therefor, it will be seen that to slidably accommodate the U-shaped member 8, there is provided on the standard 7 a guide 21 through one side of which, and the standard 7 extends bolts 22 for contracting the guide 21 in a manner to secure, by frictional contact with the legs of the U-shaped member 8, said member 8 at the desired position of vertical adjustment.

Also, the member 9 is formed from a single plate of metal or other suitable material folded transversely upon itself with the end edges thereof secured together by bolts or other fastening elements 23, and the bolted portions of the plate having parts thereof pressed outwardly to provide therebetween a sleeve for the closed end of the U-shaped member 8, while above the sleeve forming part of the folds of said plate said folds are apertured to accommodate the arm 10 of the lever 11.

The link 14 which connects the free end of the arm 13 with the spring 15 operates through a vertical slot 25 provided therefor in the lower portion of the standard 7.

Switch 6 comprises a casing 25 in which are arranged a pair of contacts 26 mounted on an insulating block 27. Slidable through an opening in one wall of the casing 25, which latter is formed of suitable di-electric material, is the aforementioned operating rod 16 that has one end connected with a spring 28 anchored to an end wall of the casing 25 and normally urging the rod 16 inwardly of the casing.

Suitably mounted on the rod 16, inwardly of the casing 25, is a block 29 of insulating material carrying a pair of contacts 30, there being one contact 30 for each contact 26. It will thus be seen that when an outward pull is exerted on the rod 16 incidental to a deflation of a tire or tires of the vehicle, contacts 30 will move into engagement with contacts 26 for completing the circuit through the signal elements 18 and 19 to the end that one in the vicinity of said signal element will know of the condition of the tires of the vehicle stored in the garage or elsewhere.

In actual practice, the assembly shown in Figures 1 and 2 may be properly positioned within the garage and chocks 31 may be resorted to to retard progress of the automobile entering the garage after the front and rear axles of the automobile have come into proper position relative to the arms 10 of the assembly.

It is thought that a clear understanding of the construction, utility and advantages of an invention of this character will be had without a more detailed description.

Having thus described the invention, what is claimed as new is:

1. In combination with a pneumatic tire supported vehicle, an alarm device, a control for the alarm device positioned on the support of the stationary vehicle and underlying a part of the vehicle supported by the pneumatic tires and means for operating the control upon deflation of the tires which causes a downward movement of a part of the vehicle.

2. In combination with a pneumatic tire supported vehicle, an alarm device, a control for the alarm device positioned on the support of the stationary vehicle and underlying a part of the vehicle supported by the pneumatic tires and means for operating the control upon deflation of the tires which causes a downward movement of a part of the vehicle, said means being adjustable relative to the part of the vehicle having such downward movement.

3. In combination with a pneumatic tire supported vehicle, an alarm device, a control for the alarm device positioned on the support of the stationary vehicle and underlying a part of the vehicle supported by the pneumatic tires and means for operating the control upon deflation of the tires which causes a downward movement of a part of the vehicle, said means comprising a lever pivoted to the support and having a free end positioned in the path of said downwardly movable part of the vehicle and said lever having its other end connected to said control.

WALTER R. ARMSTRONG, Sr.